(12) United States Patent
Cadet et al.

(10) Patent No.: US 6,612,172 B2
(45) Date of Patent: Sep. 2, 2003

(54) SOL-GEL TUBE CRACK DETECTION APPARATUS AND METHOD

(75) Inventors: Gardy Cadet, Orange, NJ (US); Victor M. Lubecke, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 69 days.

(21) Appl. No.: 09/800,048

(22) Filed: Mar. 5, 2001

(65) Prior Publication Data

US 2002/0121140 A1 Sep. 5, 2002

(51) Int. Cl.[7] ............................................. G01N 29/00
(52) U.S. Cl. ........................... 73/587; 73/601; 73/602; 73/643
(58) Field of Search .......................... 73/587, 599, 600, 73/602, 627, 629, 643, 601; 356/237.1, 430, 432, 927, 928; 65/29.18, 158, 160

(56) References Cited

U.S. PATENT DOCUMENTS

| | | | | |
|---|---|---|---|---|
| 3,931,571 A | * | 1/1976 | Hocking et al. ............... 324/37 |
| 3,937,580 A | | 2/1976 | Kasdan ........................ 356/635 |
| 4,021,217 A | * | 5/1977 | Bondybey et al. ............. 65/378 |
| 4,193,306 A | * | 3/1980 | Flaherty et al. ................ 73/629 |
| 4,501,492 A | * | 2/1985 | Douklias ..................... 356/73.1 |
| 4,511,803 A | * | 4/1985 | Ross et al. ............. 250/559.48 |
| 4,781,742 A | * | 11/1988 | Hill et al. .................... 65/29.18 |
| 4,949,073 A | | 8/1990 | Voosen ........................ 340/550 |
| 5,170,666 A | * | 12/1992 | Larsen ........................ 73/571 |
| 5,268,644 A | * | 12/1993 | Klassen et al. .............. 324/503 |
| 5,361,070 A | * | 11/1994 | McEwan ....................... 342/21 |
| 5,493,511 A | * | 2/1996 | Wincheski et al. ............ 73/577 |
| 5,519,400 A | * | 5/1996 | McEwan ....................... 342/38 |
| 5,543,783 A | | 8/1996 | Clark et al. .................. 340/550 |
| 5,616,865 A | * | 4/1997 | Webster ........................ 73/627 |
| 5,708,195 A | | 1/1998 | Kurisu et al. ............. 73/40.5 R |
| 5,714,687 A | | 2/1998 | Dunegan ....................... 73/587 |
| 5,766,208 A | | 6/1998 | McEwan ....................... 600/595 |
| 5,933,014 A | * | 8/1999 | Hartrumpf et al. .......... 324/642 |
| 5,952,561 A | * | 9/1999 | Jaselskis et al. ............... 73/866 |
| 6,008,657 A | * | 12/1999 | Suyama et al. .............. 324/639 |
| 6,008,658 A | * | 12/1999 | Suyama et al. .............. 324/642 |
| 6,014,896 A | | 1/2000 | Schoess ........................ 73/583 |
| 6,041,656 A | | 3/2000 | Dunegan ....................... 73/587 |
| 6,062,083 A | | 5/2000 | Dunegan ....................... 73/587 |
| 6,076,405 A | | 6/2000 | Schoess ........................ 73/587 |
| 6,324,912 B1 | * | 12/2001 | Wooh ........................... 73/629 |

OTHER PUBLICATIONS

US 2002/0184917 A1, Silica Structure Crack Monitoring, Dec. 12, 2002, Cadet et al.*

* cited by examiner

Primary Examiner—Hezron Williams
Assistant Examiner—Jacques Saint-Surin

(57) ABSTRACT

A crack detection method and system capable of detecting cracks on a scale of about 5 μm or greater, useful for detecting cracks in sol-gel tubes. An electromagnetic radiation signal is transmitted from a sensor to a body in which cracking may occur. The signal is reflected back to and received by the sensor. An output voltage from the sensor is measured which is proportional to a signal characteristic change between the transmitted and received signals. Signal characteristics such as frequency, phase, and amplitude may be monitored. The signal characteristic change may result from one or more mechanisms selected from the group consisting of microscopic motion of the body, media transition and fluid movement.

17 Claims, 4 Drawing Sheets

SOL-GEL TUBE CRACK DETECTION APPARATUS AND METHOD

FIELD OF THE INVENTION

The invention relates to optical fiber fabrication, and more particularly to crack detection in sol-gel bodies.

BACKGROUND OF THE INVENTION

Sol-gel tubes are formed as precursors to optical fibers. The sol-gel tubes are typically formed by extruding gel from a mold under water, then drying them to remove unwanted water. Nitrogen is then flowed around the body to extract organics and other undesirable materials. Process temperatures may reach higher than 1000° C. These high temperatures limit in situ monitoring of sol-gel tubes during the formation process. This is problematic because the sol-gel tube formation process typically spans a 48 hour period, making it difficult to isolate a process step or steps during which problems such as cracking occur.

Cracking is common during sol-gel tube fabrication. Acoustic emission techniques have been used to detect cracks in tubes. The techniques comprise monitoring sound waves generated by the cracks using contact sensors. For example, a microphone may be placed against a tube to pick up sound generated by a crack. Use of contact sensors is limited to process steps wherein temperatures are not too high. This eliminates their use in process steps in which cracking is most likely to occur. Accordingly, there is a need for a crack detection method and apparatus that may be used during high temperature process steps so that cracks can be detected as they occur. This may be beneficial to sol-gel body fabrication process development, as it allows pinpointing of process steps in need of process parameter modification and fine-tuning.

SUMMARY OF THE INVENTION

A crack detection method is disclosed capable of detecting cracks of about 5 $\mu$m wide or greater. The method is useful for detecting cracks in sol-gel tubes. A signal is transmitted from a source to a body in which cracking may occur and is reflected back to a receiver. An output voltage from the sensor is measured which is proportional to a signal characteristic change between the transmitted and received signals. Signal characteristics may include one or more of the following: frequency, phase and amplitude. The signal may result from one or more mechanisms selected from the group consisting of, microscopic motion of the body such as occurs during cracking, a media transition (solid, liquid, gas) as would occur when a tube has cracked, and solvent movement, such as a release during a fabrication process drying step.

Further disclosed is a crack detector wherein cracks are detected according to the method described above.

DESCRIPTION OF THE DRAWINGS

The invention is best understood from the following detailed description when read with the accompanying drawings.

DETAILED DESCRIPTION OF THE INVENTION

Embodiments of the invention provide crack detection in refractory bodies under a broad range of environmental conditions and may detect cracks as they occur. Transmission and reflection of electromagnetic radiation are used to detect the cracks remotely. In an illustrative embodiment, a Doppler radar technique is used. The radiation source and receiver (together "sensor") may be positioned outside of a window, protecting the sensor from the process environment, and thus allowing monitoring even at very high temperatures. The invention is particularly advantageous for crack detection in sol-gel bodies used in optical fiber formation because crack monitoring may be performed during the high temperature drying step. For simplicity the invention will be described as it applies to such bodies. Those skilled in the art will understand that embodiments of the invention may be used to detect cracks in other bodies, and thus, such applications are in the spirit and scope of the invention.

Figure 1:
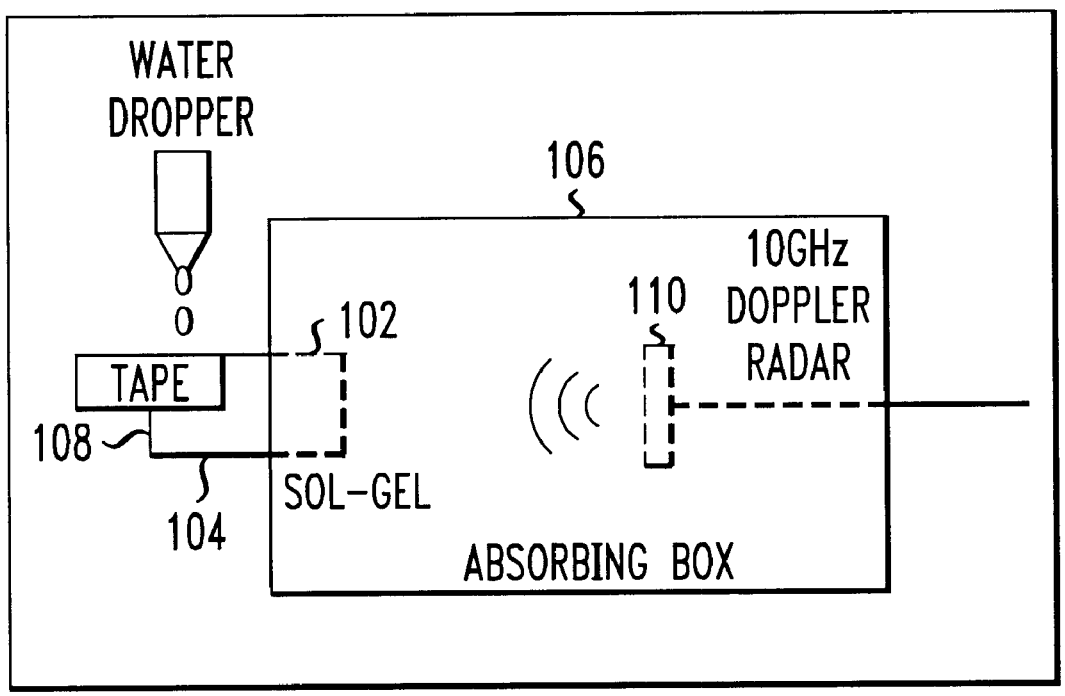
FIG. 1 depicts an experimental set-up used to demonstrate illustrative embodiments of the invention.

Advantageously the technique may easily be implemented in high temperature environments where contact sensors are impractical. FIG. 1 depicts an experimental set-up used to demonstrate the use of Doppler radar to remotely detect cracks during a sol-gel formation process. A first end 102 of a sol-gel tube 104 is inserted into an absorber-lined box 106. A second end 108 of sol-gel tube 104 protrudes from box 106. Box 106 is absorbent-lined to confine signals to the box. A 10 GHz Doppler radar motion sensor 110 is positioned within box 110, approximately three to four inches from end 102 of sol-gel tube 104. The optimum distance may vary depending on set-up parameters such as sensor specifications and tube size. The sensor frequency need not be 10 GHz. An illustrative example includes frequencies in the range of about 1 GHz to about 20 GHz. The transmitting and receiving portions of the sensor may be separate components or included in a single device.

A signal, preferably continuous, is transmitted from sensor 110 to sol-gel tube 104 and reflected by sol-gel tube 104 back to sensor 110. The output of sensor 110 is measured which is a voltage proportional to the signal characteristic change between the transmitted and received signals. Internal or external movement of the sample and/or corresponding fluid activity, including microscopic motion, result in a corresponding characteristic shift in the reflected signal, and thus the output is a measure of the magnitude of the generated crack. In an exemplary embodiment of the invention, a single frequency is monitored and evaluated to determine whether a frequency shift has occurred between the transmitted and received signals. Although microwaves have been used to experimentally demonstrate the crack detection technique, radio waves or millimeter waves may also provide satisfactory results.

Figure 3:
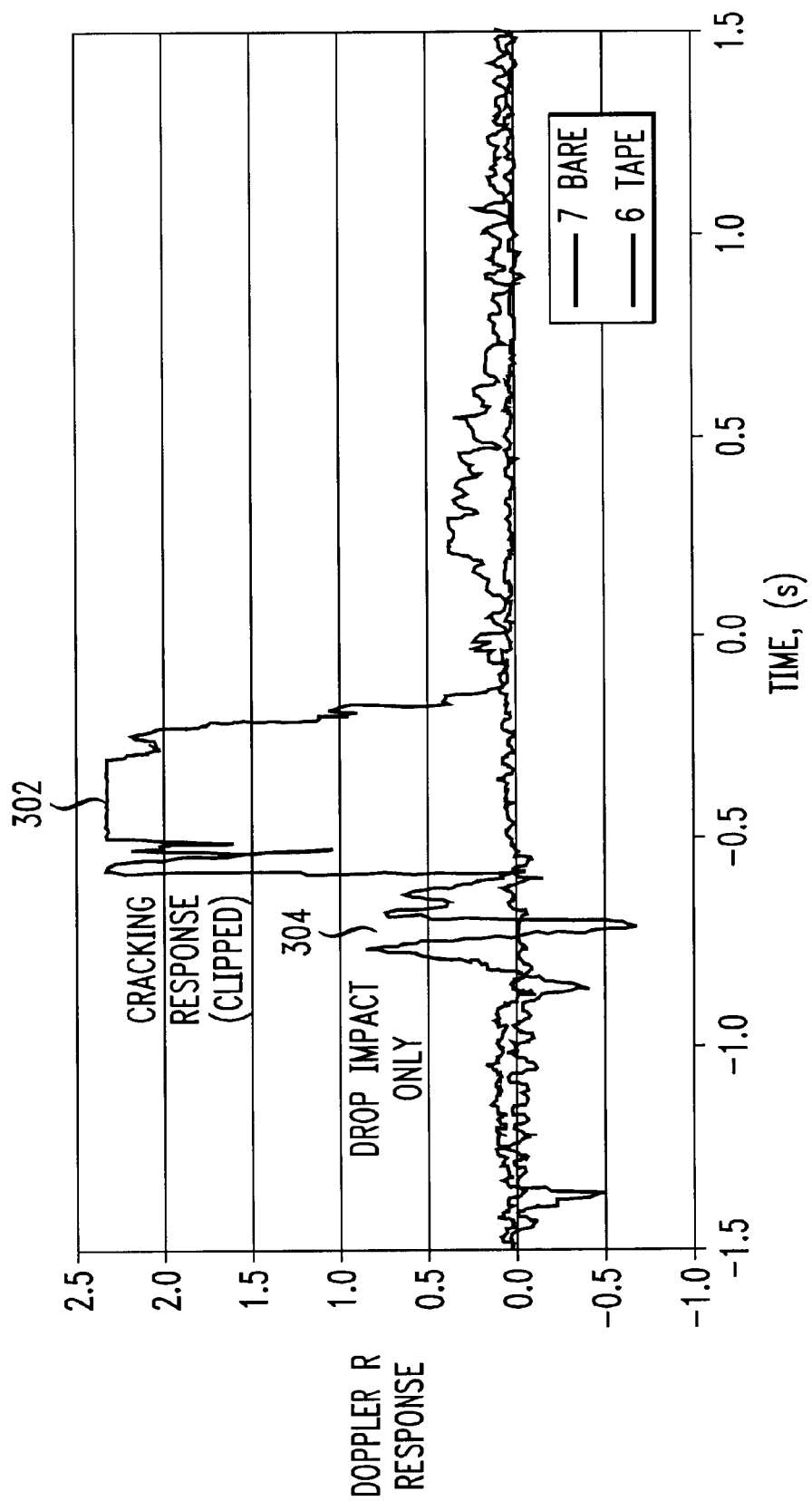
FIG. 3 depicts a Doppler response showing sol-gel tube cracking.

In the experimental set-up shown in FIG. 1, cracks are produced by dropping water on second end 108 of sol-gel tube 104. The cracks generate a red curve signal indicative of the sample cracking as depicted in FIG. 3 at peak 302. Motion caused by water droplets hitting sol-gel tube 104, as shown by peak 304, is subtracted out to isolate the motion due to cracking.

Figure 2:
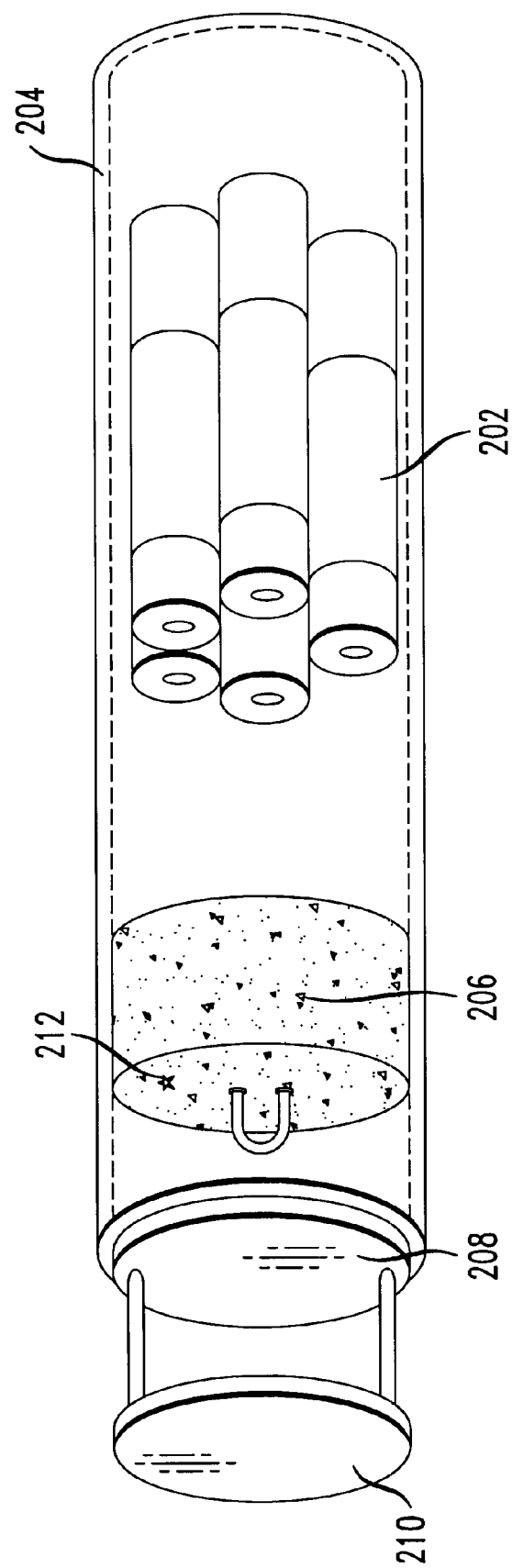
FIG. 2 depicts a crack detector according to an illustrative embodiment of the invention.

FIG. 2 depicts a portion of a crack detector according to an illustrative embodiment of the invention. Structure(s) 202 are provided within furnace 204. A plug 206, for example quartz filled with quartz wool, is provided near an end of the furnace as a heat shield. A door 208, preferably of quartz, is positioned at the furnace end that is in closest proximity to plug 206. Door 208 is substantially gas tight to seal in the environment. A cover 210, which may comprise aluminum for example, may be positioned over and spaced apart from door 208 as a safety measure. An antenna 212 is positioned within the area defined by the inner surface of cover 210 to the outer surface of plug 206, to pick-up signals from structure(s) 202 cracking. In an exemplary embodiment, cover 210 is spaced about 7 inches from door 208, door 208 is spaced about 12 inches from plug 206, and plug 206 is spaced about 20 inches from structure(s) 202. Additional illustrative dimensions include, a 16 inch diameter furnace 204, ¼–½ inch thick door 208, ⅝ inch thick cover 210, and 8 inch thick plug 206.

Figure 4:
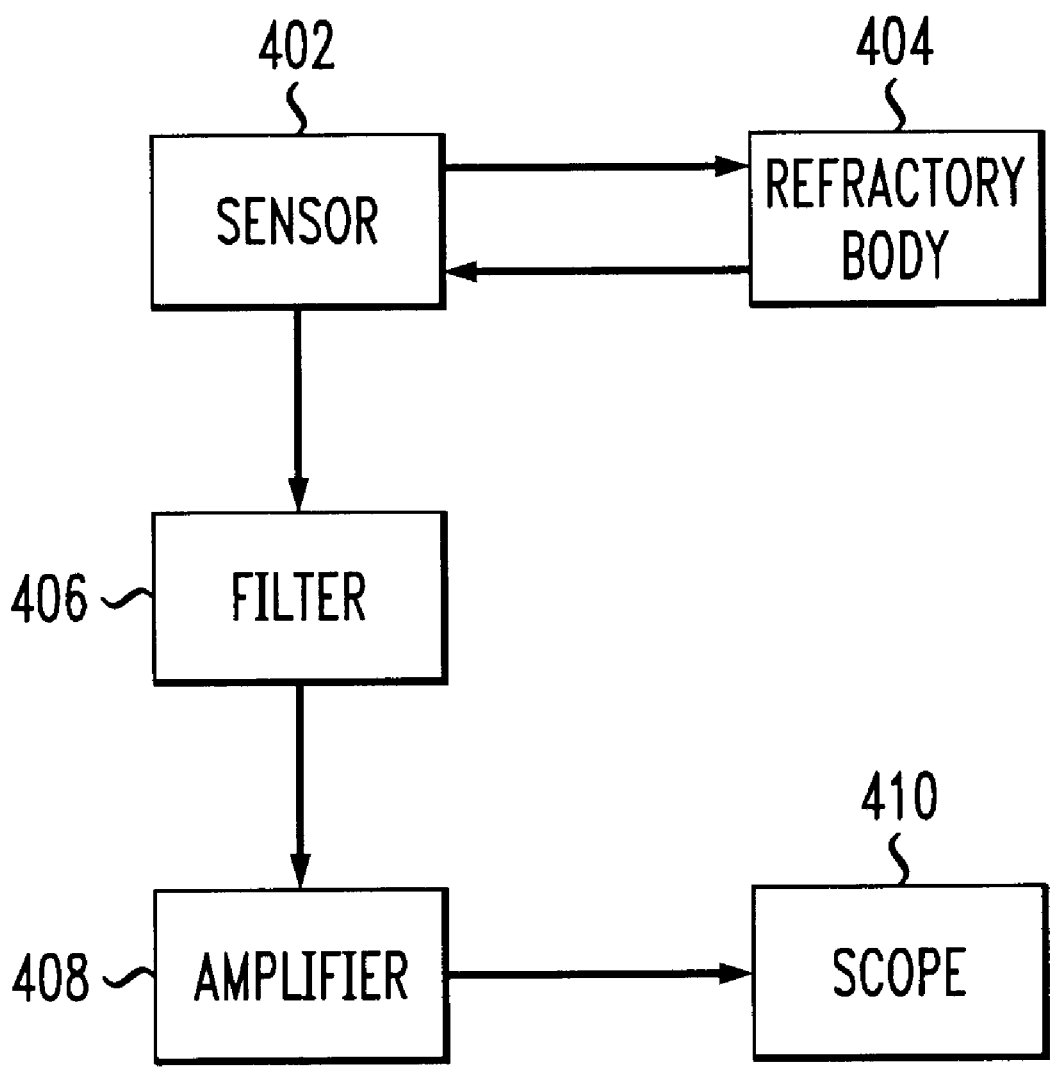
FIG. 4 depicts a block diagram of a crack detector according to an illustrative embodiment of the invention.

FIG. 4 depicts a block diagram of a crack detector according to an illustrative embodiment of the invention. Sensor 402 transmits a signal to, and receives a reflected signal from a refractory body 404. Sensor 402 may comprise a signal source, antenna(s) and mixer. The mixer output is preferably amplified and filtered. In the illustrative embodiment of the invention depicted in FIG. 4, the sensor output signal is filtered by band-pass filter 406 to remove, for example DC offset and high-frequency noise. The sensor output signal is amplified by amplifier 408 to optimize the signal for phase change monitoring. Filtering and amplification may be performed in any order, with filtering preferably being performed first.

An electronic scope 410 may be used to provide a visual display of the monitored shift produced by cracking. A Tectonic 601 digital scope was successfully used in experiments to demonstrate the feasibility of the crack detection technique.

The system may further include an automated, real-time computer threshold analysis that would provide notification of detected signal characteristic changes. Notification may be audible or visible.

Measurements may be performed by passing the electromagnetic radiation signal through a window. The window may be any material through which the signal may be transmitted and reflected sufficiently to detect signal characteristic shifts caused by cracking. A window with minimum attenuation will allow sensor 110 to operate outside a sample environment with sufficient sensitivity. High temperatures and flowing gases should cause no significant reflection or attenuation of the microwave signal, and thus should have little or no effect on measurements. An exemplary window material is quartz.

Cracking may produce signal characteristic shifts by one or more mechanisms. First is a shift produced by microscopic internal and/or external motion caused by the cracking body. Additionally, a shift caused by the radar passing through an interface of two or more media. For example, the signal may first impinge on a continuous material such as sol-gel, then after cracking, impinge a second material or combination of materials such as sol-gel/air/sol-gel. Furthermore, a signal characteristic shift may be produced by movement of a solvent or other fluid which may be present from a fabrication process or other source. For example, Doppler radar may pick up movement of solvent during a sol-gel drying process more readily than sol-gel tube movement itself.

The crack detection may be performed over a wide range of temperatures. An illustrative temperature range is from about 600° F. to about 1000° F. These temperatures are commonly found in sol-gel tube fabrication processes.

Embodiments of the crack detection method may be used to detect cracks of substantially any magnitude. Advantageously embodiments of the invention may be used to detect cracks causing microscopic motion. In an exemplary embodiment of the invention cracks of approximately 10 $\mu$m or greater are detected. In a further illustrative embodiment motion due to cracking is resolved on a scale of about 5 $\mu$m to about 1 mm, which is beneficial for applications such as sol-gel tube formation.

The invention further includes a method for sol-gel body fabrication process development. The method begins by providing and carrying out a sol-gel fabrication process. Cracks are detected in real time during the process, thereby isolating one or more process steps during which cracking occurs. The one or more process steps are adjusted until cracking is diminished or eliminated. Embodiments of the process development method include crack detection methods as described herein.

While the invention has been described by illustrative embodiments, additional advantages and modifications will occur to those skilled in the art. Therefore, the invention in its broader aspects is not limited to specific details shown and described herein. Modifications to, for example, environmental conditions under which crack detection is performed and the frequency of the electromagnetic radiation signal, may be made without departing from the spirit and scope of the invention. Accordingly, it is intended that the invention not be limited to the specific illustrative embodiments but be interpreted within the full spirit and scope of the appended claims and their equivalents.

What is claimed:

1. A crack detection method comprising:
   transmitting from at least one sensor to a body an electromagnetic radiation signal;
   receiving by the at least one sensor the electromagnetic radiation signal reflected by the body;
   measuring an output voltage from at least one sensor that is proportional to a signal characteristic change between the transmitted and received electromagnetic radiation signals;
   wherein the signal characteristic change results from one or more mechanisms selected from the group consisting of, microscopic motion of the body, media transition and fluid movement.

2. The crack detection method of claim 1 wherein the cracks are detected in a sol-gel body.

3. The crack detection method of claim 2 wherein the sol-gel body is a precursor to a fiber optic tube.

4. The crack detection method of claim 1 performed in the temperature range of about 600° F. to about 1000° F.

5. The crack detection method of claim 1 wherein motion is resolved on a scale of greater than about 5 $\mu$m.

6. The crack detection method of claim 5 wherein motion is resolved on a scale of about 5 $\mu$m to about 1 mm.

7. The crack detection method of claim 1 wherein the signal has a frequency in the range of about 1 GHz to about 20 GHz.

8. The crack detection method of claim 1 wherein cracks are detected as they occur.

9. The crack detection method of claim 1 wherein a single frequency is analyzed.

10. The crack detection method of claim 1 further comprising:
    filtering the output signal; and
    amplifying the output signal.

11. The crack detection method of claim 1 further comprising providing a visual display of the signal characteristic change.

12. The crack detection method of claim 1 further comprising providing notification of detected signal characteristic changes real-time computer threshold analysis.

13. A method for sol-gel body fabrication process development comprising:

provided a sol-gel process;

carrying out the process;

detecting in real time, cracking of the sol-gel body during the process thereby isolating one or more process steps causing the cracking; and adjusting the one or more process steps until cracking is diminished;

wherein cracks are detected according to claim 1.

14. A method for sol-gel body fabrication process development comprising:

providing a sol-gel process;

carrying out the process;

detecting in real time, cracking of the sol-gel body during the process thereby isolating one or more process steps causing the cracking; and adjusting the one or more process steps until cracking is diminished;

wherein cracks are detected according to claim 1.

15. A crack detector for use with a furnace comprising:

a plug positioned near an end of the furnace;

a door positioned at the end of the furnace closest to the plug;

a cover positioned over the door; and an antenna positioned within the area defined by an inner surface of the cover to an outer surface of the plug;

wherein cracks are detected according to the method of claim 1.

16. A crack detector to detect cracks in a body, the detector comprising:

a sensor comprising:

an electromagnetic radiation signal source; and a receiver positioned to receive an electromagnetic radiation signal from the electromagnetic radiation signal source reflected by the body;

wherein a crack is detected by transmitting from the electromagnetic radiation signal source to the body an electromagnetic radiation signal;

receiving by the sensor the electromagnetic radiation signal reflected by the body; and measuring an output voltage from the sensor that is proportional to the signal characteristic change between the transmitted and received electromagnetic radiation signals; and wherein the signal characteristic change results from one or more mechanisms selected from the group consisting of, microscopic motion of the body, media transition and fluid movement.

17. The crack detector of claim 16 used to detect cracks in a sol-gel body.

* * * * *